United States Patent [19]

Kawano

[11] Patent Number: 5,359,478
[45] Date of Patent: Oct. 25, 1994

[54] RECORDING MEDIUM LOADING DEVICE WITH DETECTION SWITCH

[75] Inventor: Kenji Kawano, Tokyo, Japan

[73] Assignee: Canon Kabushiki Kaisha, Tokyo, Japan

[21] Appl. No.: 344,481

[22] Filed: Apr. 27, 1989

Related U.S. Application Data

[63] Continuation of Ser. No. 34,860, Apr. 3, 1987, abandoned.

[30] Foreign Application Priority Data

Apr. 11, 1986 [JP] Japan ................................. 1-082325

[51] Int. Cl.$^5$ ..................... G11B 15/675; G11B 17/03
[52] U.S. Cl. ................... 360/96.6; 360/96.5; 360/99.06; 369/77.2
[58] Field of Search ................... 360/96.6, 96.5, 99.02, 360/99.06; 369/77.1, 77.2

[56] References Cited

U.S. PATENT DOCUMENTS

| | | | |
|---|---|---|---|
| 3,766,327 | 10/1973 | Johnson et al. | 360/96.6 |
| 4,345,283 | 8/1982 | Maryschka | 360/96.6 |
| 4,661,868 | 4/1987 | Tezuka | 360/96.5 |

*Primary Examiner*—David Severin
*Attorney, Agent, or Firm*—Robin, Blecker, Daley & Driscoll

[57] ABSTRACT

A recording medium loading device is provided with one detecting member capable of detecting both whether or not a recording medium has been loaded at a predetermined position in a holder and whether or not the holder has been latched at a predetermined position in a recording and reproducing apparatus, so that a plurality of states can be detected with a simple structure.

15 Claims, 3 Drawing Sheets

RECORDING MEDIUM LOADING DEVICE WITH DETECTION SWITCH

This application is a continuation, of application Ser. No. 034,860, filed Apr. 3, 1987 now abandoned.

BACKGROUND OF THE INVENTION

1. Field of the Invention

This invention relates to a recording medium loading device.

2. Description of the Prior Art

The conventional device of this kind, as disclosed, for example, in U.S. patent application Ser. No. 826,117 (Japanese Laid-Open Patent Application No. Sho 61-182669) assigned to the same assignee of the present invention, is constructed with inclusion of a first detecting means for detecting whether or not the recording medium is inserted into a prescribed position of a holder within the recording and reproduction apparatus and a second detecting means for detecting whether or not the inserted recording medium has thoroughly travelled up to the recording or reproducing position only when detection signals are obtained from both detecting means simultaneously is the loading of the recording medium taken as complete, and this a recording or reproducing operation permitted to start.

However, because this structure necessitates at least two detecting means, the conventional device is not only of large size as a whole with a high production cost, but it also has a problem that the use of complicated detecting mechanisms makes it difficult to improve recording fidelity.

SUMMARY OF THE INVENTION

The present invention has been made to eliminate such problems of the conventional device, and its object is to provide a device for loading a recording medium which device is of reduced size and low cost of manufacture, and the use of which allows for achieving high recording fidelity.

In an embodiment of the device for loading a recording medium according to the present invention, one detecting means is arranged to cooperate with a movable member in the holder in such manner that whether or not the recording medium is seated in a prescribed position within the holder and whether or not the holder is latched are detected at the same time when the travelling member, e.g., part of a holder latch, is in a set or locked position.

Since, in the above-described embodiment, only one detecting means suffices for detecting when the loading of the recording medium is complete, it is possible to reduce the number of detecting means from that used in the prior art, simplifying the holder structure. This produces an advantage that a minimization of the size and a reduction of the production cost of the recording and reproducing apparatus is achieved. Another advantage is that the reduction of the complexity of structure of the detecting mechanism contributes to an improvement of the reliability of the apparatus.

These and other objects and features of the invention will become apparent from the following description with reference to the drawings.

DETAILED DESCRIPTION OF THE PREFERRED EMBODIMENT

Figure 1:
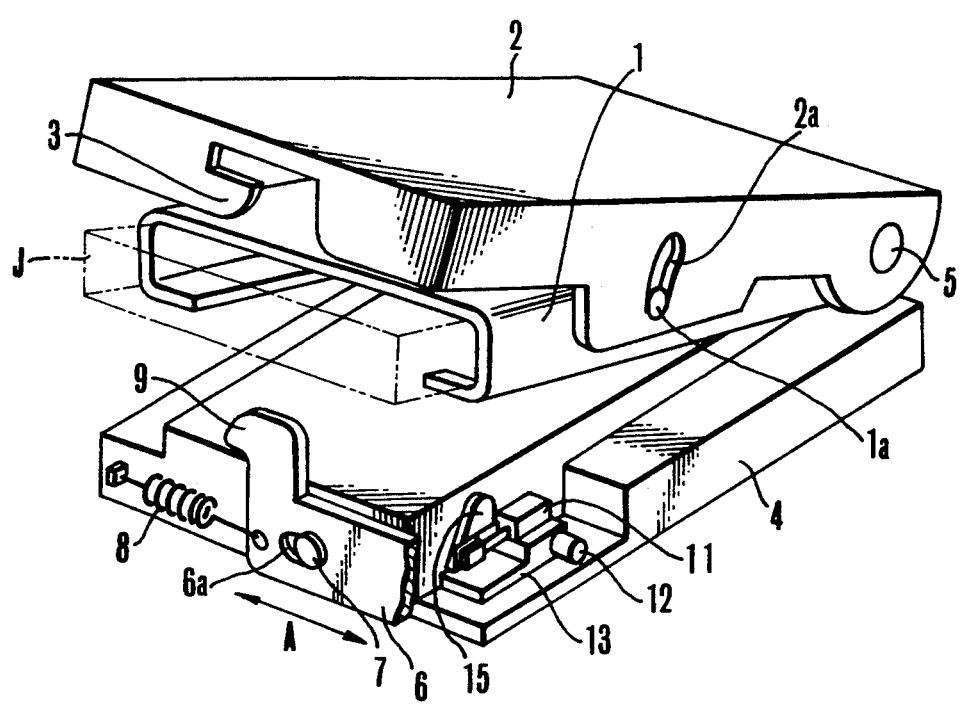
FIG. 1 is a perspective view of an embodiment of a device for loading a recording medium for use in recording and reproduction apparatus according to the present invention.
Figure 2:
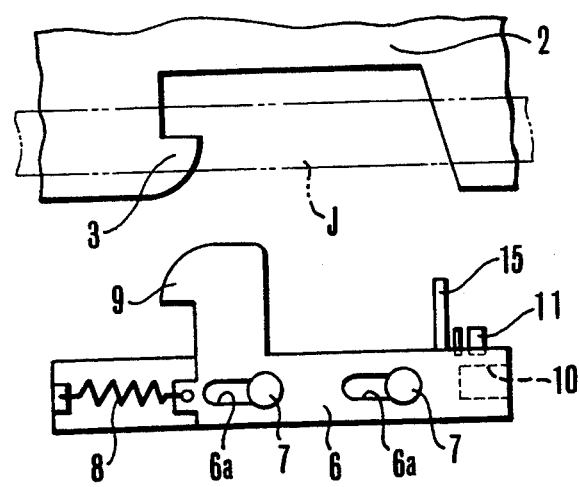
FIG. 2 is a front elevational view of the main parts of the device of FIG. 1.

In the drawings, a holding frame 1 for a recording medium in a jacket J and an outer box or cover 2 for the holding frame 1 are pivotally mounted on a common shaft 5 fixedly secured to a base plate 4. 3 is a lock member provided in the outer box 2, the lock member having a rounded edge part as shown. The above-described holding frame 1 and the outer box 2 are assembled by putting a guide pin 1a carried in frame 1 in an arcuate guiding slot 2a of box 2 so that the frame and box are pivotable relative to each other within the movement defined by the guiding slot 2a. A spring (not shown) normally urges both members 1 and 2 to be open to a maximum extent in the range of the guiding slot 2a, a condition as is illustrated in FIG. 1.

A lock knob 6 is mounted at its guide slot 6a to the base plate 4 by a guide pin 7. This knob 6 is movable along the front side of the base plate 4 in directions of arrow A by a distance equal to the length of the guide slot 6a and is urged by a coil spring 8 to move normally away from a detection member, i.e., a leaf switch 11 to be described later. 9 is a cooperating latch member part provided on the lock knob 6 for engaging with the above-described lock member 3 to hold the box or cover 2 locked closed on the base member, the latch member part like lock member part 3 having a rounded edge part. 10 is in a projected portion formed on the lock knob 6 for pushing the leaf switch 11 to move it to an actuated condition and as to be described later, this projected portion extending from the end portion of the lock knob 6 toward the leaf switch 11 side.

Figure 3A:
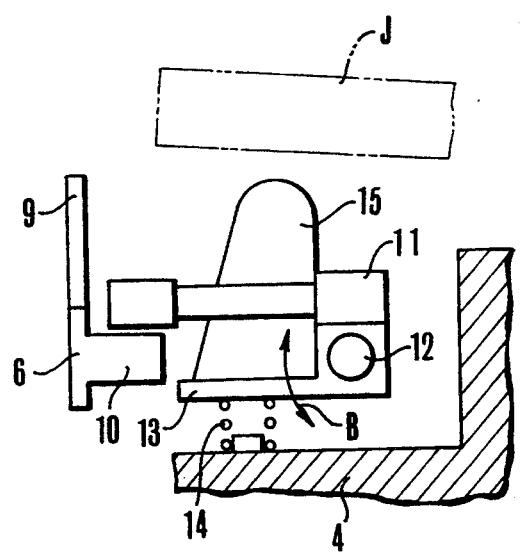
FIGS. 3(a) and 3(b) are side elevational views of the main parts of the device of FIG. 1.
Figure 3B:
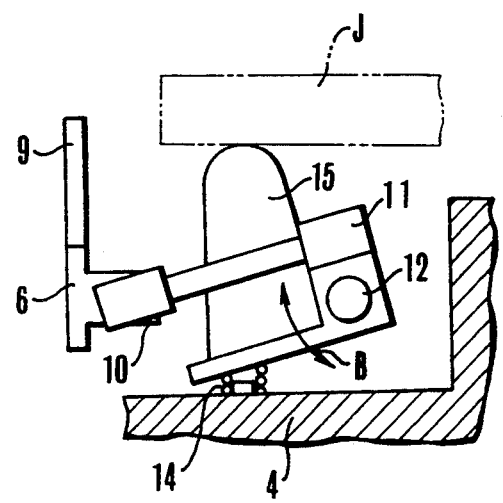

11 is a leaf switch as the detecting means, the actuating of the switch providing, as described above in the prior art description, a detection signal indicative of the state of the loading device as being loaded properly with the recording medium so that recording or reproducing operation of the recording and reproducing apparatus can proceed. This switch 11, shown normally open in FIG. 4(a) and in closed or actuated condition in FIG. 4(c), is mounted on a switch carrier 13 pivotally mounted at a rotary shaft 12 on the base plate 4 to turn in directions of arrow B. A coil spring 14 urges the switch carrier 13 to turn normally toward the outer box 2 side so that the leaf switch 11 cannot be engaged with the projected portion 10 of the lock knob 6 as shown in FIG. 3(a) when that lock knob 6 is slid to engage latch 9 with lock member 3. 15 is a projected portion provided on the switch carrier 13. This projected portion 15 is engaged and pushed by the jacket J when the outer box 2 is closed, thereby the leaf switch 11 is moved downward to a position where it can interfere and thus be engaged with the projected portion 10 of the lock knob 6 as shown in FIG. 3(b).

The operation of the loading device of such construction is described below.

Figure 4A:
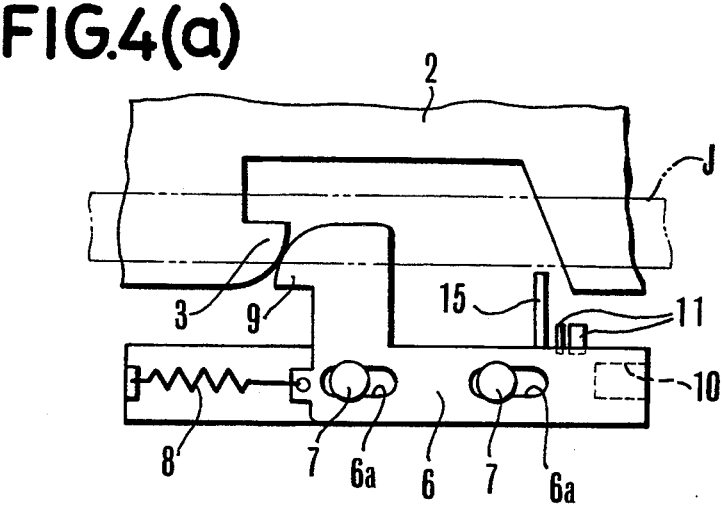
FIGS. 4(a) to 4(c) illustrate a manner in which the embodiment operates.
Figure 4B:
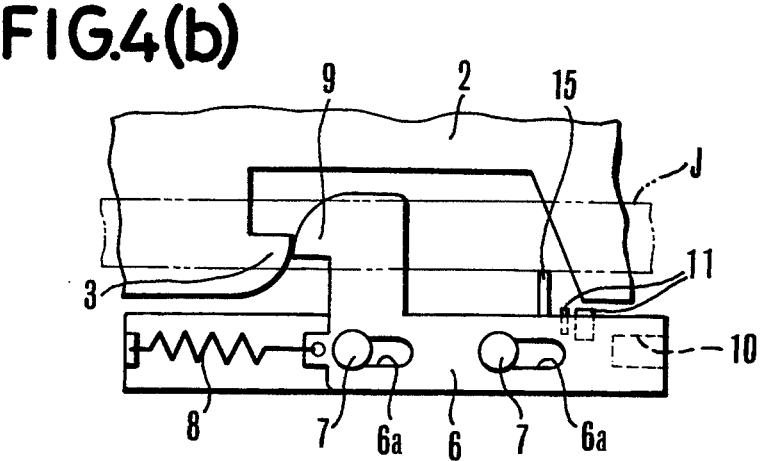
Figure 4C:
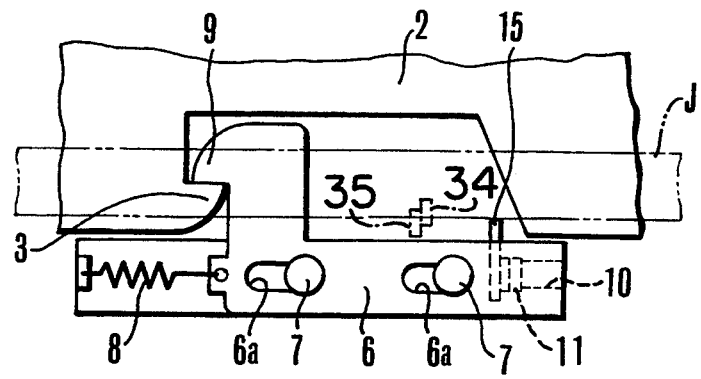

After the jacket J has been inserted into and seated in the holding frame 1, when the outer box 2 is being closed, the lock member 3 of the outer box 2 first abuts on the member 9 to be locked as shown in FIG. 4(a), so that the lock knob 6 starts to move toward the leaf switch 11 side, the rounded edge parts of the lock member 3 and latch member 9 facilitating this abutment and the sliding movement rightwardly of the lock knob against the bias of spring 8. As the closing of the outer box 2 goes on, the projected portion 15 of the switch carrier 13 is then pushed by the jacket J as shown in FIG. 4(b), so that the leaf switch 11 on the switch carrier 13 is pushed down into the path of movement of the projected portion 10 of the lock knob 6 so that the leaf switch 11 is engaged with that projected portion 10 during leftward travel of the latch member in moving to a latching position. And, as shown in FIG. 4(c), when the lock member 3 of the outer box 2 is locked or latched by the member 9 of the lock knob 6, the spring-biased lock knob 6 has moved to the left as viewed in the drawing, and its projected portion 10 has engaged or pushed the leaf switch 11 to an actuated or turn on condition.

In such a manner, by the turning-on of the leaf switch 11, it is ascertained that the jacket J has perfectly been set on the recording medium loading device.

As has been described above, in this embodiment, it is made that when the lock member 3 of the outer box 2 is locked to the member 9 to be locked of the lock knob 6, the leaf switch 11 turns on. Hence, by the one detecting means, that is, one leaf switch 11 only, it becomes possible to detect that the jacket J lies within the holding frame 1, and further whether or not it is surely set on the recording medium loading means as the holding frame is finally locked.

As a result, fewer detecting means than used in the prior art are used, and the recording medium loading means, and, the recording and reproduction apparatus as well, can be smaller in size and at lower price. Also, the detecting mechanism becomes simpler as the detecting means become fewer in number, thereby contributing to an increase of the reliability as the apparatus. FIG. 4(c) depicts the manner in which recording/reproducing head 34 carried an head carrier 35 is employed with the recording and reproducing means for recording and/or reproducing signals on and/or from the recording medium, such arrangement being similar to that shown in U.S. Pat. No. 4,661,868.

As has been described above, according to the present invention, whether or not the loading of the recording medium is complete can be detected by but a single means. This leads to realization of a recording medium loading device of reduced size and price while still permitting an improvement of the reliability thereof.

What is claimed is:

1. A recording medium loading device comprising:
   (a) holder means for holding a recording medium, said holder means being movable between a first position capable of receiving said recording medium and a predetermined second position, while holding a recording medium inserted therein;
   (b) latching means movable between a latching position for latching said holder means which has been moved to said second position, thereby locking the same in the second position, and an unlatching position for unlocking said holder means from said second position; and
   (c) detecting means movable between an operating position where said detecting means operates to detect the presence or absence of said recording medium in said holder means and to detect whether said holder means is latched by said latching means or not in cooperation with movement of said latching means from said unlatching position to said latching position and a non-operating position where such detecting means does not cooperate with said movement of said latching means, said detecting means being arranged to engage said recording medium held in said holder means when said holder means is moved from said first position to said second position and to move from said non-operating position to said operating position.

2. A device according to claim 1, wherein said holder means is pivotable relative to said recording medium loading device.

3. A device according to claim 1, further comprising:
   recording and/or reproducing means capable of recording and/or reproducing signals on and/or from said recording medium in said second position.

4. A device according to claim 1, wherein said detecting means includes a leaf switch.

5. A loading device for loading a jacket containing a recording medium, comprising:
   (a) carrier means for holding a jacket, said carrier means being arranged to be movable between a first position capable of receiving a jacket inserted therein and a second position for loading said jacket into a predetermined loading position;
   (b) a latching member for latching said carrier means in the second position; and
   (c) a detecting member which is arranged to be moved, depending upon the presence or absence of the jacket in said carrier means, said detecting member being moved, in response to the presence of a jacket in said carrier means, to a position where it is possible to detect completion of latching operation to latch said carrier means by said latching means where the jacket is held in said carrier means when said carrier has been moved to said second position.

6. A device according to claim 5, wherein said carrier means is pivotally supported relative to the device.

7. A device according to claim 5, further comprising:
   recording and/or reproducing means capable of recording and/or reproducing signals on and/or from said recording medium in said second position.

8. A device according to claim 5, wherein said detecting member responsive to detection of the fact that said jacket is held by said carrier means is displaced in a first direction, and responsive to action of said latching member is displaced in a second direction different from the first direction.

9. A recording medium loading device comprising:
   a base plate,
   a holder member connected to said base plate and movable thereon from a first open position to a second closed position on said base plate, said holder member receptively receiving a recording medium inserted therein,
   cooperating latch means carried by said base plate and said holder member for latch locking said holder member in said second closed position thereof, said latch means including a latch member movable in a path between unlatched and latching positions, and
   a detection member including a movable carrier therefor mounted on said base plate, said carrier being shiftable between first and second mounting positions thereof, said detection member being actuatable from an open to a closed actuated condition to output a detection signal that a recording medium is received in the holder member by said carrier engaging said recording medium, when the holder member moves from its first to second position to shift said carrier from its first to second mounting positions, said detection member when the carrier member is in second position locating adjacent the movement path of said latch member whereby the latch member in moving from unlatched to latching positions can engage said detection member to actuate same.

10. A device according to claim 9 in which the holder member is pivoted to the base plate.

11. A device according to claim 10 in which the latch member is slidably mounted on the base plate, there being a bias means connected with said latch member tending to slide it in a latching direction.

12. A device according to claim 11 in which the holder member includes a cover with a lock member thereon, the lock member during movement of the cover from first to second positions engaging the latch member to slide it in a unlatching direction counter to the effect of said bias means until the cover member has been moved to fully closed position wherein the lock member slides clear of the latch member releasing the latch member to slide in a latching direction for locking the cover in closed position.

13. A device according to claim 12 in which the holder member includes a holder free, the cover being pivoted to said holder frame for limited pivoting movement relative thereto.

14. A device according to claim 12 in which the movable carrier is pivotally mounted to the base plate.

15. A device according to claim 14 in which the detection member is a leaf spring, the latch member carrying a projection thereon, the projection engaging the leaf spring to actuate same.

* * * * *

UNITED STATES PATENT AND TRADEMARK OFFICE
CERTIFICATE OF CORRECTION

PATENT NO. : 5,359,478
DATED : October 25, 1994
INVENTOR(S) : Kenji Kawano It is certified that error appears in the above-identified patent and that said Letters Patent is hereby corrected as shown below:

Col. 1, line 25. Delete "the".

Col. 1, line 26. Delete "a".

Col. 3, line 39. Change "as" to -- of --.

Col. 3, line 41. Change "34 carried" to -- carrier 34 -- and change "an" to -- and -- and change "is" to -- are --.

Col. 4, line 13. Change "pivotable relative" to -- pivotally connected --.

Col. 4, line 42. Change "relative to" to -- on --.

Col. 6, line 5. Change "a" to -- an --.

Col. 6, line 6. Delete "member".

Col. 6, line 12. Change "free" to -- frame --.

Signed and Sealed this

Seventh Day of March, 1995

*Attest:*

BRUCE LEHMAN

*Attesting Officer*     *Commissioner of Patents and Trademarks*